United States Patent
Prescavage et al.

(10) Patent No.: US 10,731,743 B2
(45) Date of Patent: Aug. 4, 2020

(54) CAM FOLLOWER AND YOKE ROLLER ASSEMBLIES

(71) Applicant: ROLLER BEARING COMPANY OF AMERICA, INC., Oxford, CT (US)

(72) Inventors: James Prescavage, Hainsport, NJ (US); Robert Pallini, Cheltenham, PA (US); Michael J. Hartnett, Middlebury, CT (US); Robert Lugosi, Palm Beach Gardens, FL (US); Bradley T. Smith, Glastonbury, CT (US); Bogdan T. Mania, Lawrenceville, CT (US)

(73) Assignee: Roller Bearing Company of America, Inc., Oxford, CT (US)

( * ) Notice: Subject to any disclaimer, the term of this patent is extended or adjusted under 35 U.S.C. 154(b) by 176 days.

(21) Appl. No.: 15/824,335

(22) Filed: Nov. 28, 2017

(65) Prior Publication Data

US 2018/0149257 A1    May 31, 2018

Related U.S. Application Data

(63) Continuation-in-part of application No. 15/046,158, filed on Feb. 17, 2016, now Pat. No. 10,274,013, and
(Continued)

(51) Int. Cl.
*F16H 53/06* (2006.01)
*F16C 19/28* (2006.01)
(Continued)

(52) U.S. Cl.
CPC ............ *F16H 53/06* (2013.01); *F16C 13/006* (2013.01); *F16C 19/28* (2013.01); *F16C 33/783* (2013.01);
(Continued)

(58) Field of Classification Search
CPC ........ F16C 13/006; F16C 19/28; F16C 33/783; F16H 53/06
See application file for complete search history.

(56) References Cited

U.S. PATENT DOCUMENTS 2,265,554 A    12/1941   Thomas et al.
2,897,022 A    7/1959    Marola et al.
(Continued)

FOREIGN PATENT DOCUMENTS

EP    2990674 A1 *   3/2016
EP    3336370 A1 *   11/2017
(Continued)

OTHER PUBLICATIONS

European Search Opinion of EP Application No. 17204448.9, dated May 23, 2018. (Year: 2018).*
(Continued)

*Primary Examiner* — Vinh Luong
(74) *Attorney, Agent, or Firm* — Murtha Cullina LLP

(57) ABSTRACT

A roller assembly includes an outer ring having an interior having an inner surface extending an overall axial length between first and a second axial ends. The inner surface has a radially inward facing bearing surface extending between first and second radially inwardly extending flanges. The roller assembly includes a one piece inner member extending into the interior and having a groove formed therein between third and a fourth axial ends. A retaining ring is positioned in the groove. A first row of first rollers is positioned in the interior and between the retaining ring and the first radially extending flange. A second row of second rollers is positioned in the interior between the retaining ring and the second radially extending flange. An annular seal engages the inner member and has an overall axial width no more than 6% of the length of the outer ring.

16 Claims, 4 Drawing Sheets

Related U.S. Application Data a continuation-in-part of application No. 14/865,998, filed on Sep. 25, 2015, now Pat. No. 9,982,768, which is a continuation-in-part of application No. 14/577,126, filed on Dec. 19, 2014, now abandoned, which is a continuation-in-part of application No. 13/678,031, filed on Nov. 15, 2012, now abandoned.

(60) Provisional application No. 61/560,593, filed on Nov. 16, 2011.

(51) Int. Cl.
*F16C 33/78* (2006.01)
*F16C 13/00* (2006.01)

(52) U.S. Cl.
CPC ...... *F16C 33/7853* (2013.01); *F16C 33/7823* (2013.01); *F16C 2361/00* (2013.01)

(56) References Cited

U.S. PATENT DOCUMENTS

| | | |
|---|---|---|
| 3,145,996 A | 8/1964 | Ninos et al. |
| 5,484,242 A | 1/1996 | Meyer |
| 5,531,137 A | 7/1996 | Guilford |
| 2009/0175567 A1 | 7/2009 | Prescavage et al. |
| 2012/0243930 A1 | 9/2012 | Pastoors et al. |
| 2014/0254970 A1* | 9/2014 | Guilford ............... F16C 13/006 384/569 |
| 2015/0101387 A1 | 4/2015 | Pallini |
| 2015/0330449 A1* | 11/2015 | Ribault .................. F16C 33/62 384/512 |
| 2016/0091072 A1 | 3/2016 | Hartnett et al. |
| 2016/0160922 A1 | 6/2016 | Pallini et al. |
| 2017/0108048 A1 | 4/2017 | Frantz |
| 2018/0355913 A1* | 12/2018 | Pallini ..................... F16C 19/16 |
| 2019/0219146 A1* | 7/2019 | Malychok ............. F16C 33/581 |
| 2019/0264738 A1* | 8/2019 | Malychok ............... F16H 53/06 |

FOREIGN PATENT DOCUMENTS

| | | |
|---|---|---|
| WO | 2009116269 A1 | 9/2009 |
| WO | 2013122158 A1 | 8/2013 |
| WO | 2014058049 A1 | 4/2014 |
| WO | 2014141986 A1 | 9/2014 |

OTHER PUBLICATIONS

Extended European Search Report issued in corresponding EP Application No. 17204448.9, dated May 23, 2018, pp. 1-11.

* cited by examiner

CAM FOLLOWER AND YOKE ROLLER ASSEMBLIES

CROSS REFERENCE TO RELATED APPLICATIONS

This application is a continuation in part of commonly owned and copending U.S. patent application Ser. No. 15/046,158 entitled "CAM Follower with Tire Having Axial Movement Mitigation Features", filed on Feb. 17, 2016, which is a continuation in part application of and claims priority to U.S. patent application Ser. No. 14/577,126, filed on Dec. 19, 2014, which is a continuation in part application of and claims priority to U.S. patent application Ser. No. 13/678,031 entitled, filed on Nov. 15, 2012, which is a non-provisional application of and claims priority to U.S. Provisional Application No. 61/560,593, filed on Nov. 16, 2011, the contents of these applications are incorporated herein by reference in their entireties. This application is a continuation in part application of and claims priority to U.S. patent application Ser. No. 14/865,998, entitled "Self Lubricating CAM Follower Assembly", filed on Sep. 25, 2015, which is a non-provisional application of and claims priority to U.S. Provisional Application No. 62/055,272, filed on Sep. 25, 2014, the contents of these applications are incorporated herein by reference in their entireties. This application is a non-provisional application of and claims priority to U.S. Provisional Application No. 62/428,099, entitled "CAM Follower and Yoke Roller Assemblies", filed on Nov. 30, 2016, the entirety of which is incorporated by reference herein.

TECHNICAL FIELD

The present invention is directed to a cam follower assembly and a yoke roller assembly and more specifically to a cam follower assembly and a yoke roller assembly having an axial thrust retainer, a double row of rolling elements and a thin profile seal.

BACKGROUND

Cam follower assemblies and yoke roller assemblies are used in many industrial manufacturing and conveying applications. The cam follower assemblies and the yoke roller assemblies each typically include an outer ring disposed around an inner ring with a plurality of rolling elements such as needle rollers disposed in a cavity therebetween. An annular seal is positioned on each axial end thereof, between the inner ring and the outer ring to keep debris from entering the cavity. The seals occupy an axial length of the cam follower assemblies and the yoke roller assemblies.

The size of the cam follower assemblies and yoke roller assemblies are generally limited to a predetermined envelope. For example, the axial length of cam follower assemblies may be limited a length of the cam that the cam follower rides on. The length of the yoke roller may be limited by the distance between yoke arms that the yoke roller is mounted on of on the length of the surface that the yoke roller engages. The length of the rolling elements is limited because of the axial length which the seals occupy. The outside diameter of the cam follower assemblies and the yoke roller assemblies may also be limited to a predetermined size.

Cam follower assemblies and yoke roller assemblies are subject to high loads when used in various applications. The load capacity of the cam follower assemblies and yoke roller assemblies depends on the diameter and length of the rolling elements disposed therein. However efforts to increase the load capacity of the cam follower assemblies and yoke roller assemblies have been plateaued because of the above described size limitations.

Based on the foregoing, there is a need for cam follower assemblies and yoke roller assemblies with increased load capacity.

SUMMARY

There is disclosed herein a roller assembly for a cam follower or a yoke roller. The roller assembly includes an outer ring having an interior area. The interior area is defined by an inner surface extending an overall axial length between a first axial end and a second axial end of the outer ring. The inner surface has a radially inward facing bearing surface extending between a first radially inwardly extending flange and a second radially inwardly extending flange. The roller assembly includes a one piece inner member extending into the interior area. The inner member has a groove formed therein between a third axial end and a fourth axial end of the inner member. The inner member extends continually between the third axial end and the fourth axial end: The roller assembly includes a retaining ring positioned in the groove. A first row of a plurality of first rollers is positioned in the interior area between and in rolling engagement with the inner member and the radially inward facing bearing surface. The first row of the plurality first rollers is positioned between and engages the retaining ring and the first radially extending flange. A second row of a plurality of second rollers is positioned in the interior area between and in rolling engagement with the inner member and the radially inward facing bearing surface. The second row of the plurality second rollers is positioned between and engages the retaining ring and the second radially extending flange. Each of the plurality of first rollers and each of the plurality of second rollers has a roller length and a roller outside diameter. A ratio of the roller length to the roller outside diameter is less than 2.8. The outer ring has a second outside diameter and a ratio of the second outside diameter to the roller outside diameter ranges from 7.25 to 9.75. The inner surface further includes a first seal receiving pocket formed between the first radially inwardly extending flange and the first axial end. A first annular seal positioned in and seated (e.g., press fit or otherwise fixedly secured) in the first seal receiving pocket. A portion of the first annular seal slidingly and sealingly engages the inner member. The first annular seal has a first overall axial width. The first overall axial width is no more than 6% of the overall axial length of the outer ring.

In one embodiment, the first annular seal includes a metallic annular ring that has a mounting section located circumferentially around a radially outermost portion of thereof. The metallic annular ring has a first leg extending axially away and radially inward from the mounting section. The first leg has a radially and axially inward facing sloped surface. The metallic annular ring has a second leg extending radially inward from the first leg and terminating at a distal end. The first annular seal includes an elastomeric member that has a base secured to the radially and axially inward facing sloped surface. The elastomeric member has a flexible sealing leg extending away from the radially and axially inward facing sloped surface for sealing engagement with the inner member of the roller assembly. The flexible sealing leg terminates at a sealing engagement surface which extends radially inward from the distal end of the second leg.

The metallic annular ring and the elastomeric member have an overall axial width configured to provide structural support and sealing and the overall axial width is from about 0.075 inches to about 0.080 inches to facilitate the extension of roller length without increase in overall length of the roller assembly, yielding increased load capacity of the roller assembly.

In one embodiment, the mounting section includes a flap folded over a portion of the mounting section and forming a bend on a radially outermost portion of the mounting section for seating (e.g., press fitting or otherwise fixedly securing) in a groove of the outer ring of the roller assembly.

In one embodiment, the first annular seal has an elastomeric member secured to an annular metallic ring.

In one embodiment, the inner surface further includes a second seal receiving pocket formed between the second radially inwardly extending flange and the second axial end. A second annular seal is positioned in and seated (e.g., press fit or otherwise fixedly secured) in the second seal receiving pocket. A portion of the second annular seal slidingly and sealingly engages the inner member. The second annular seal has a first overall axial width and an overall axial width that is no more than 6% of the overall length of the outer ring.

In one embodiment, the second annular seal includes an elastomeric member secured to an annular metallic ring.

In one embodiment, the inner member is made from a carbon steel. In one embodiment a portion of the inner member has a carburized case hardened case depth of 0.03 to 0.04 inches. In one embodiment, the inner member has a surface hardness of 59 to 62 Rockwell C scale. In one embodiment, the inner member has a core hardness of 30 to 35 Rockwell C scale.

In one embodiment, axial ends of the retaining ring engage the groove, the plurality of first rollers slidingly engage one of the axial ends of the retaining ring and the plurality of second rollers slidingly engage another of the axial ends of the retaining ring to limit axial movement of the outer ring relative to the inner member.

In one embodiment, the inner member has a shaft that extends outwardly from the first axial end and/or the second axial end.

In one embodiment, the inner member is an annular ring.

There is further disclosed herein a thin profile seal for a roller assembly. The thin profile seal includes a metallic annular ring that has a mounting section located circumferentially around a radially outermost portion of thereof. The metallic annular ring has a first leg that extends axially away and radially inward from the mounting section. The first leg has a radially and axially inward facing sloped surface. The metallic annular ring has a second leg extending radially inward from the first leg and terminating at a distal end. The thin profile seal includes an elastomeric member that has a base secured to the radially and axially inward facing sloped surface. The elastomeric member has a flexible sealing leg extending away from the radially and axially inward facing sloped surface for sealing engagement with an inner member of the roller assembly. The flexible sealing leg terminates at a sealing engagement surface which extends radially inward from the distal end of the second leg. The metallic annular ring and the elastomeric member have an overall axial width configured to provide structural support and sealing. The overall axial width is from about 0.075 inches to about 0.080 inches, to facilitate the extension of roller length without increase in overall length of the roller assembly, yielding increased load capacity of the roller assembly.

In one embodiment, the mounting section includes a flap folded over a portion of the mounting section and forming a bend on a radially outermost portion of the mounting section for seating in a groove of an outer ring of the roller assembly.

DETAILED DESCRIPTION

Figure 1:
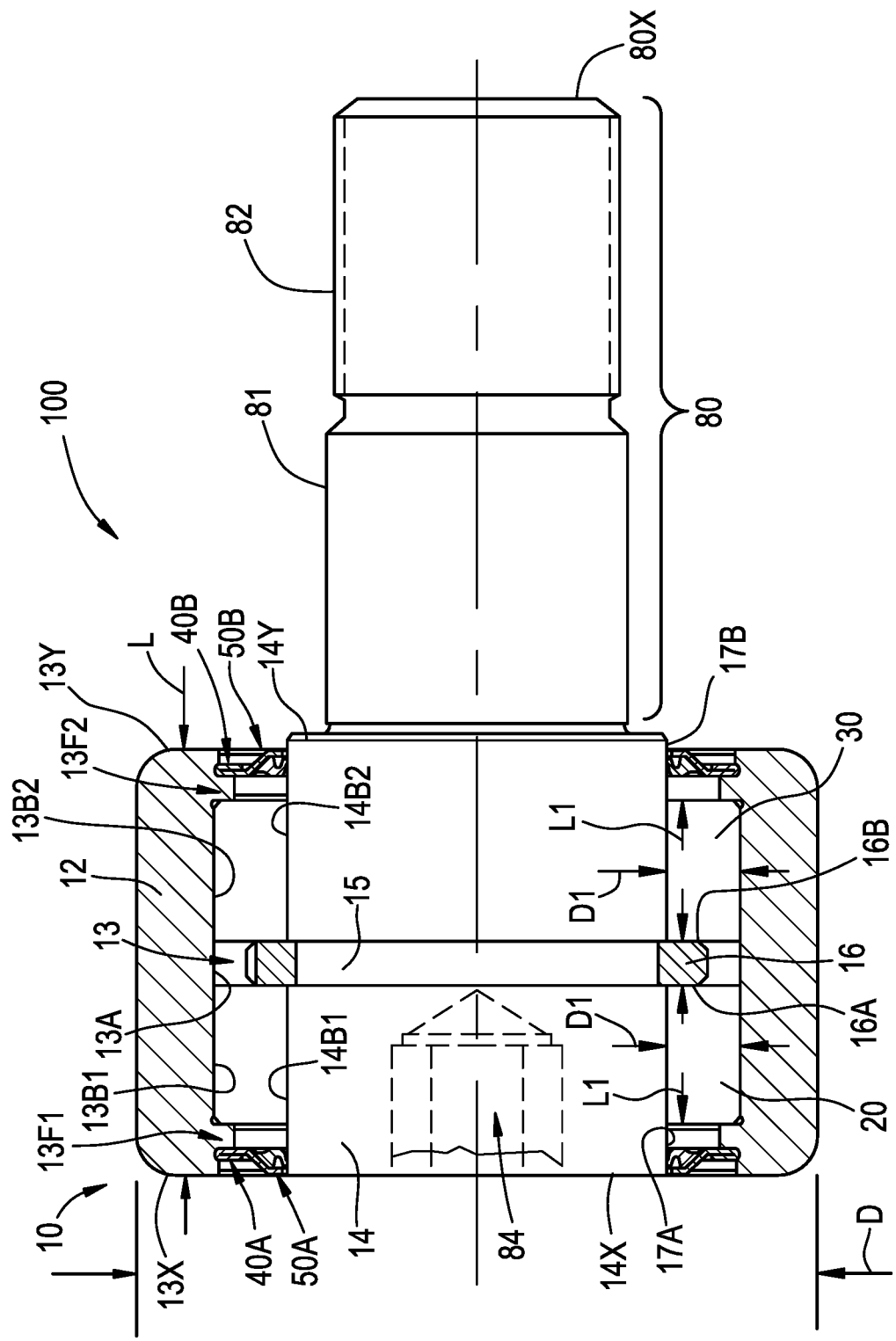
FIG. 1 is cross sectional view of a cam follower assembly of the present invention.

As shown in FIG. 1 a roller assembly for a cam follower 100 is generally designated by the reference number 10. The roller assembly 10 includes an outer ring 12 having an interior area 13. The interior area 13 is defined by an inner surface 13A extending an overall axial length L between a first axial end 13X and a second axial end 13Y of the outer ring 13. The inner surface 13A has a radially inward facing bearing surface 13B1, 13B2 extending between a first radially inwardly extending flange 13F1 and a second radially inwardly extending flange 13F2.

Figure 4:
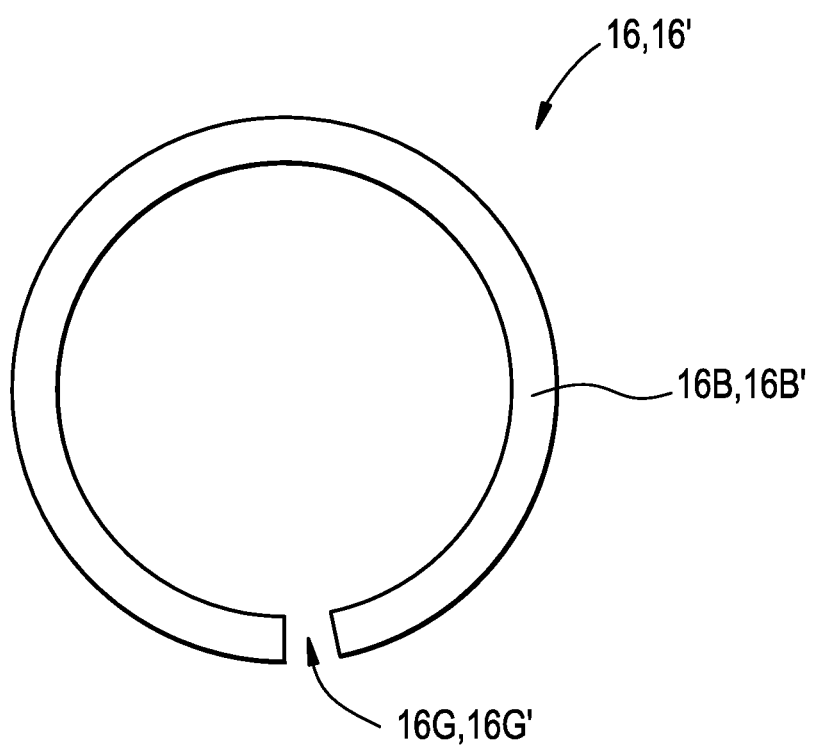
FIG. 4 is front view of the split ring of the cam follower of FIG. 1 and the yoke roller of FIG. 2.

As shown in FIG. 1, the roller assembly 10 includes an inner member 14 extending into the interior area 13. The inner member 14 has a groove 15 formed therein and located between opposite axial ends 14X and 14Y of the inner member 14. A retaining ring 16 is positioned in the groove 15, as described herein. As shown in FIG. 4 the retaining ring 16 is a split ring having an annular body portion 16B and a gap 16G therein.

As shown in FIG. 1, the inner member 14 has a shaft 80 extending axially outward from the second axial end 14Y. The shaft 80 includes a shank portion 81 and a threaded portion 82. The threaded portion 82 extends axially inward from an axial end 80X of the shaft 80. In one embodiment the inner member 14 is manufactured from a carbon steel alloy. In one embodiment, the exterior surfaces 14B1 and 14B2 of the inner member have a carburized case hardened case depth of 0.03 to 0.04 inches. In one embodiment, the exterior surfaces 14B1 and 14B2 have a surface hardness of 59 to 62 Rockwell C scale. In one embodiment, the inner member and/or the shaft 80 have a core hardness of 30 to 35 Rockwell C scale.

As shown in FIG. 1, the roller assembly 10 includes a first row of a plurality of first rollers 20 positioned in the interior area 13 and in rolling engagement with the inner member 14 (i.e., an exterior surface 14B1 of the inner member 14) and the radially inward facing bearing surface 13B1. The first row of the plurality first rollers 20 is positioned axially between and engaging the retaining ring 16 (i.e., a first axial end 16A of the retaining ring 16) and the first radially extending flange 13F1.

As shown in FIG. 1, the roller assembly 10 includes a second row of a plurality of second rollers 30 positioned in the interior area 13 and in rolling engagement with the inner member 14 (i.e., an exterior surface 14B2 of the inner member 14) and the radially inward facing bearing surface 13B2. The second row of the plurality of second rollers 30 is positioned axially between and engaging the retaining ring 16 (i.e., a second axial end 16B of the retaining ring 16) and the second radially extending flange 13F2.

Thus, the first axial end 16A, second axial end 16B, the first radially inwardly extending flange 13F1 and the second radially inwardly extending flange 13F2 limit axial movement of the outer ring 12 relative to the inner member 14.

As shown in FIG. 1, each of the plurality of first rollers 20 and each of the plurality of second rollers 30 have a roller length L1. In one embodiment, the ratio of roller length L to roller outside diameter D1 is less than 2.8 to provide increased load capacity compared to prior art roller assemblies. In one embodiment, the roller length L1 is about 0.410 inches and the dynamic load capacity of the roller assembly 10 is about 13,140 pounds.

Each of the plurality of first rollers 20 and each of the plurality of second rollers 30 has an outside diameter D1 and the outer ring 12 has an outside diameter D. A ratio of the outside diameter D1 of the rollers 20, 30 to the second outside diameter D of the outer ring 12 ranges from 7.25 to 9.75.

As shown in FIG. 1, the inner surface 13A of the roller assembly 10 includes a first seal receiving pocket 40A formed between the first radially inwardly extending flange 13F1 and the first axial end 13X. A first annular seal 50A is positioned in and seated in the first seal receiving pocket 40A, as described herein. A portion (i.e., a radially innermost portion) of the first annular seal 50A slidingly and sealingly engages the inner member 14 (i.e., an exterior surface 17A of the inner member 14).

As shown in FIG. 1, the inner surface 13 of the roller assembly includes a second seal receiving pocket 40B formed between the second radially inwardly extending flange 13F2 and the second axial end 14Y. A second annular seal 50B is positioned in and seated in the second seal receiving pocket 40B. A portion (i.e., a radially innermost portion) of the first annular seal 50A slidingly and sealingly engages the inner member 14 (i.e., an exterior surface 17B of the inner member 14).

Figure 2:
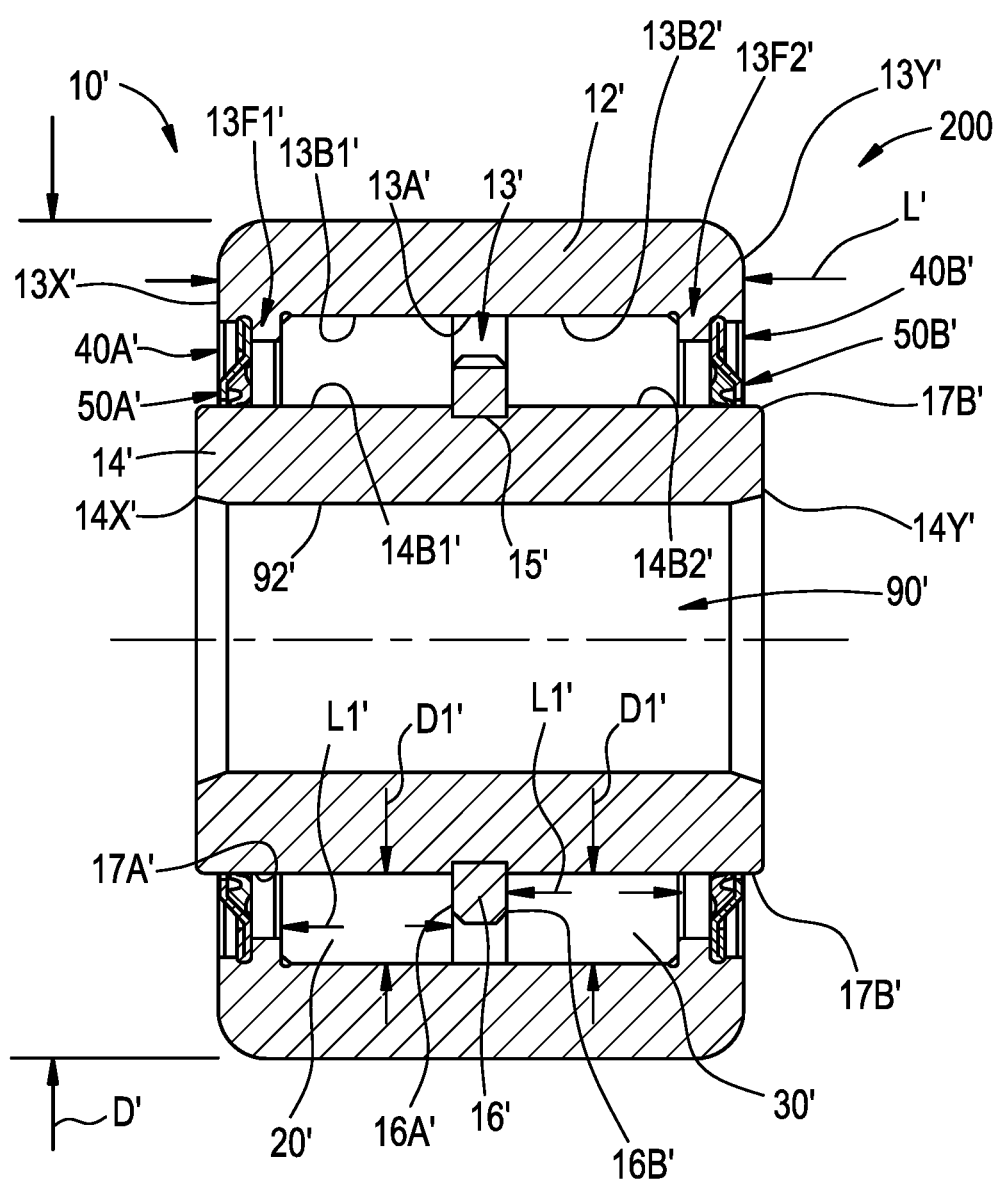
FIG. 2 is a cross sectional view a yoke roller assembly of the present invention.

As shown in FIG. 2 a roller assembly for a yoke roller 200 is generally designated by the reference number 10'. The roller assembly 10' includes an outer ring 12' having an interior area 13'. The interior area 13' is defined by an inner surface 13A' extending an overall axial length L' between a first axial end 13X' and a second axial end 13Y' of the outer ring 12'. The inner surface 13A' has a radially inward facing bearing surface 13B1', 13B2' extending between a first radially inwardly extending flange 13F1' and a second radially inwardly extending flange 13F2'.

As shown in FIG. 2, the roller assembly 10' includes an inner member 14' extending into the interior area 13'. The inner member 14' has a groove 15' formed therein and located between opposite axial ends 14X and 14Y' of the inner member 14'. A retaining ring 16' is positioned in the groove 15', as described herein. As shown in FIG. 4 the retaining ring 16' is a split ring having an annular body portion 16B' and a gap 16G' therein.

As shown in FIG. 2, the inner member 14' has a bore 90' extending therethrough. The bore 90' is defined by an inner surface 92' of the inner member 14'. In one embodiment, the inner member 14' is manufactured from a carbon steel alloy. In one embodiment, the exterior surfaces 14B1' and 14B2' of the inner member 14' have a carburized case hardened case depth of 0.03 to 0.04 inches. In one embodiment, the exterior surfaces 14B1' and 14B2' have a surface hardness of 59 to 62 Rockwell C scale. In one embodiment, the inner member 14' has a core hardness of 30 to 35 Rockwell C scale.

As shown in FIG. 2, the roller assembly 10' includes a first row of a plurality of first rollers 20' positioned in the interior area 13' and in rolling engagement with the inner member 14' (i.e., an exterior surface 14B1' of the inner member 14') and the radially inward facing bearing surface 13B1'. The first row of the plurality first rollers 20' is positioned axially between and engaging the retaining ring 16' (i.e., a first axial end 16A' of the retaining ring 16') and the first radially extending flange 13F1'.

As shown in FIG. 2, the roller assembly 10' includes a second row of a plurality of second rollers 30' positioned in the interior area 13' and in rolling engagement with the inner member 14' (i.e., an exterior surface 14B2' of the inner member 14') and the radially inward facing bearing surface 13B2'. The second row of the plurality second rollers 30' is positioned axially between and engaging the retaining ring 16' (i.e., a second axial end 16B' of the retaining ring 16') and the second radially extending flange 13F2'.

Thus, the first axial end 16A', second axial end 16B', the first radially inwardly extending flange 13F1' and the second radially inwardly extending flange 13F2' limit axial movement of the outer ring 12' relative to the inner member 14'.

As shown in FIG. 2, each of the plurality of first rollers 20' and each of the plurality of second rollers 30' have a roller length L1'. The ratio of roller length to roller outside diameter is less than 2.8 to provide increased load capacity compared to prior art roller assemblies. In one embodiment, the roller length L1' is about 0.410 inches and the dynamic load capacity of the roller assembly 10' is about 13,140 pounds.

Each of the plurality of first rollers 20' and each of the plurality of second rollers 30' has an outside diameter D1' and the outer ring 12 has an outside diameter D'. A ratio of the outside diameter D1' of the rollers 20', 30' to the second outside diameter D' of the outer ring 12' ranges from 7.25 to 9.75.

As shown in FIG. 2, the inner surface 13A' of the roller assembly 10' includes a first seal receiving pocket 40A' formed between the first radially inwardly extending flange 13F1' and the first axial end 13X'. A first annular seal 50A' is positioned in and seated in the first seal receiving pocket 40A', as described herein. A portion (i.e., a radially innermost portion) of the first annular seal 50A' slidingly and sealingly engages the inner member 14' (i.e., an exterior surface 17A' of the inner member 14').

As shown in FIG. 2, the inner surface 13' of the roller assembly 10' includes a second seal receiving pocket 40B' formed between the second radially inwardly extending flange 13F2' and the second axial end 14Y'. A second annular seal 50B' is positioned in and seated in the second seal receiving pocket 40B'. A portion (i.e., a radially innermost portion) of the first annular seal 50A' slidingly and sealingly engages the inner member 14' (i.e., an exterior surface 17B' of the inner member 14').

Figure 3:
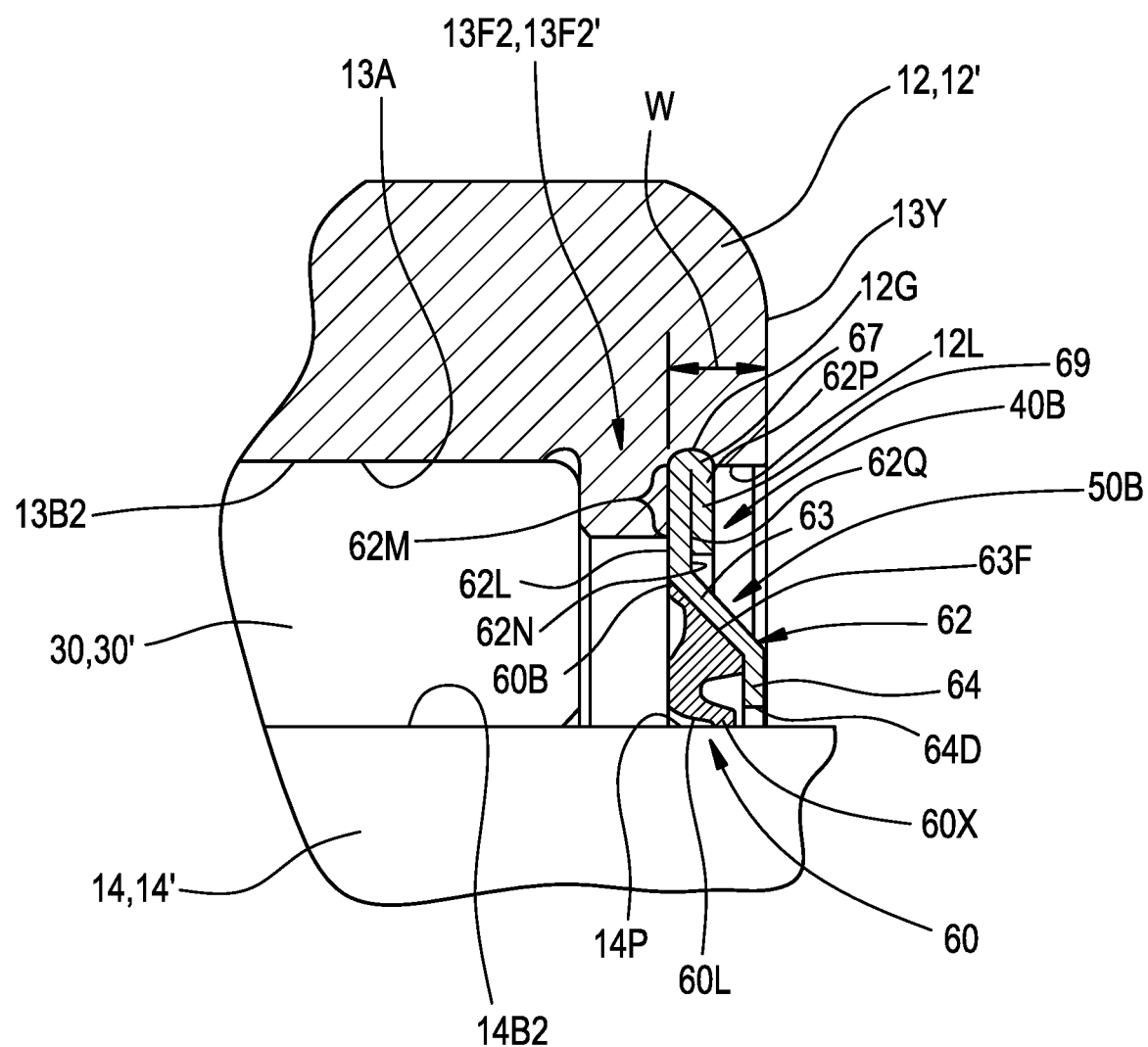
FIG. 3 is an enlarged cross sectional view of a seal portion of the cam follower of FIG. 1 and the yoke roller of FIG. 2.

As shown in FIG. 3, the second annular seal 50B has an overall axial width W. The second annular seal 50B has a designed overall axial width W that consumes only 6% of the overall axial length L. The first annular seal 50A is configured similar to the second annular seal 50B and has the same thinness ratio as the second annular seal 50B. While the overall axial widths W of the first annular seal 50A and the second annular seal 50B are described as being equal, the present invention is not limited in this regard.

As shown in FIG. 3, a groove 12G is formed in the inner surface 13A of the outer ring 12 axially outward of the second radially inwardly extending flange 13F2 and a lip 12L extending radially inward proximate the second axial end 13Y of the outer ring 12.

As best shown in FIG. 3, the second annular seal 50B is a thin profile seal that includes an elastomeric member 60 secured to an annular metallic ring 62. The annular metallic ring 62 has a mounting section 62M located circumferentially around a radially outermost portion of thereof. The metallic annular ring 62 has a first leg 63 extending axially away and radially inward from the mounting section 62M. The first leg 63 has a radially and axially inward facing sloped surface 63F. The metallic annular ring 62 has a second leg 64 extending radially inward from the first leg 63 and terminating at a distal end 64D.

The mounting section 62M includes a first leg 62L having an axially outward first flat surface 62N. The mounting section 62M further includes a second leg 62P having an axially inward facing second flat surface 62Q. The second leg 62P defines a flap 69 folded over the first leg 62L and forming a bend 67 between the first leg 62L and the second leg 62P such that the first flat surface 62N is engaged along the second flat surface 62Q. The bend 67 is formed on a radially outermost portion of the mounting section 62M for seating in the groove 12G of the outer ring 12 of the roller assembly 10.

As best shown in FIG. 3, the elastomeric member 60 has a base 60B secured to the radially and axially inward facing sloped surface 63F. The elastomeric member 60 has a flexible sealing leg 60L extending away from the base 60B and the radially and axially inward facing sloped surface 63F for sealing engagement with a portion of the exterior surface 17B of the inner member 14 of the roller assembly 10. The flexible sealing leg 60L terminating at a sealing engagement surface 60X thereof. The sealing engagement surface 60X extends radially inward from the distal end 64D of the second leg 64. The metallic annular ring 62 and the elastomeric member 60 have an overall axial width W configured to provide structural support and sealing.

The first annular seal 50A and the second annular seal 50B each have an overall axial width is from about 0.075 inches to about 0.080 inches. The designed thinness of the first and second annular seals 50A and 50B provides for extension of roller length, thereby yielding increased load capacity. The first annular seal 50A and the second annular seal 50B each have a designed axial width W which consumes no more than 6% of the overall length L of the outer ring.

The first annular seals 50A, 50A' and the second annular seal 50B' are configured the same as the second annular seal 50B.

Although the invention has been described with reference to particular embodiments thereof, it will be understood by one of ordinary skill in the art, upon a reading and understanding of the foregoing disclosure that numerous variations and alterations to the disclosed embodiments will fall within the scope of this invention and of the appended claims.

What is claimed is:

1. A roller assembly for a cam follower or a yoke roller, the roller assembly comprising:
    an outer ring having an interior area, the interior area being defined by an inner surface extending an overall axial length between a first axial end and a second axial end of the outer ring, the inner surface having a radially inward facing bearing surface extending between a first radially inwardly extending flange and a second radially inwardly extending flange;
    a one piece inner member extending into the interior area, the inner member having a groove formed therein between a third axial end and a fourth axial end of the inner member, the inner member extending continually between the third axial end and the fourth axial end:
    a retaining ring positioned in the groove;
    a first row of a plurality of first rollers positioned in the interior area between and in rolling engagement with the inner member and the radially inward facing bearing surface, the first row of the plurality first rollers being positioned between and engaging the retaining ring and the first radially extending flange;
    a second row of a plurality of second rollers positioned in the interior area between and in rolling engagement with the inner member and the radially inward facing bearing surface, the second row of the plurality second rollers being positioned between and engaging the retaining ring and the second radially extending flange;
    each of the plurality of first rollers and each of the plurality of second rollers having a roller length and a roller outside diameter;
    wherein a ratio of the roller length to the roller outside diameter is less than 2.8;
    the outer ring having a second outside diameter;
    wherein a ratio of the second outside diameter to the roller outside diameter ranges from 7.25 to 9.75;
    the inner surface further comprises a first seal receiving pocket formed between the first radially inwardly extending flange and the first axial end; and
    a first annular seal positioned in and seated in the first seal receiving pocket, a portion of the first annular seal slidingly and sealingly engaging the inner member, the first annular seal having a first overall axial width, the first overall axial width being no more than 6% of the overall axial length of the outer ring, wherein at least one of:
        (a) the first annular seal comprises:
            a metallic annular ring having a mourning section located circumferentially around a radially outermost portion of thereof, the metallic annular ring having a first leg extending axially away and radially inward from the mounting section, the first leg having a radially and axially inward facing sloped surface, and the metallic annular ring having a second leg extending radially inward from the first leg and terminating at a distal end;
            an elastomeric member having a base secured to the radially and axially inward facing sloped surface, the elastomeric member having a flexible sealing leg extending away from the radially and axially inward facing sloped surface for sealing engagement with the inner member of the roller assembly, the flexible sealing leg terminating at a sealing engagement surface, the sealing engagement surface extends radially inward from the distal end of the second leg of the metallic annular ring;
            the metallic annular ring and the elastomeric member having an overall axial width configured to provide structural support and sealing; and
        (b) the mounting section includes a first mounting leg, having an axially outward first flat surface and a second mounting leg having an axially inward facing second flat surface, wherein the second mounting leg defines a flap folded over the first mounting leg and limning a bend between the first mounting leg and the second mounting leg, such that the first flat surface is engaged along the second flat surface, wherein the bend is formed on a radially outermost portion of the mounting section for seating in a groove of the outer ring of the roller assembly.

2. The roller assembly of claim 1, wherein the overall axial width is from about 0.075 inches to about 0.080 inches, to facilitate the extension of roller length without increase in overall length of the roller assembly, yielding increased load capacity of the roller assembly.

3. The roller assembly of claim 1, wherein the first annular seal comprises an elastomeric member secured to an annular metallic ring.

4. The roller assembly of claim 1, wherein:
the inner surface further comprises a second seal receiving pocket formed between the second radially inwardly extending flange and the second axial end; and
a second annular seal positioned in and seated in the second seal receiving pocket, a portion of the second annular seal slidingly and sealingly engaging the inner member, the second annular seal having a first overall axial width; and
the second annular seal having an overall axial width that is no more than 6% of the overall length of the outer ring.

5. The roller assembly of claim 1, wherein the second annular seal comprises an elastomeric member secured to an annular metallic ring.

6. The roller assembly of claim 1, wherein the inner member comprises a carbon steel.

7. The roller assembly of claim 1, wherein a portion of the inner member has a carburized case hardened case depth of 0.03 to 0.04 inches.

8. The roller assembly of claim 1, wherein the inner member has a surface hardness of 59 to 62 Rockwell C scale.

9. The roller assembly of claim 1, wherein the inner member has a core hardness of 30 to 35 Rockwell C scale.

10. The roller assembly of claim 1, wherein axial ends of the retaining ring engage the groove, the plurality of first rollers slidingly engage one of the axial ends of the retaining ring and the plurality of second rollers slidingly engage another of the axial ends of the retaining ring to limit axial movement of the outer ring relative to the inner member.

11. The roller assembly of claim 1, wherein the inner member comprises a shaft that extends outwardly from at least one of the first axial end and the second axial end.

12. The roller assembly of claim 1, wherein the inner member comprises an annular ring.

13. The roller assembly of claim 1, wherein the overall axial width is from about 0.075 inches to about 0.080 inches, to facilitate the extension of roller length without increase in overall length of the roller assembly, yielding increased load capacity of the roller assembly.

14. A seal for a roller assembly, the seal comprising:
a metallic annular ring having a mounting section located circumferentially around a radially outermost portion of thereof, the metallic annular ring having a first leg extending axially away and radially inward from the mounting section, the first leg having a radially and axially inward facing sloped surface, and the metallic annular ring having a second leg extending radially inward from the first leg and terminating at a distal end;
an elastomeric member having a base secured to the radially and axially inward facing sloped surface, wherein at least one of:
a. the elastomeric member having a flexible sealing leg extending away from the radially and axially inward facing sloped surface for sealing engagement with an inner member of the roller assembly, the flexible sealing leg terminating at a sealing engagement surface, the sealing engagement surface extends radially inward from the distal end of the second leg of the metallic annular ring;
the metallic annular ring and the elastomeric member having an overall axial width configured to provide structural support and sealing; and
b. the mounting section includes a first mounting leg having an axially outward first flat surface and a second mounting leg having an axially inward facing second flat surface, wherein the second mounting leg defines a flap folded over the first mounting leg and limning a bend be the first mounting leg and the second mounting leg, such that the first flat surface is engaged along the second flat surface, wherein the bend is formed on a radially outermost portion of the mounting section for seating in a groove of the outer ring of the roller assembly.

15. The seal of claim 14, wherein the overall axial width is from about 0.075 inches to about 0.080 inches, to facilitate the extension of roller length without increase in overall length of the roller assembly, yielding increased load capacity of the roller assembly.

16. The seal of claim 14 installed in a roller assembly for a cam follower or yoke assembly, the roller assembly comprising:
an outer ring having an interior area, the interior area being defined by an inner surface extending an overall axial length between a first axial end and a second axial end of the outer ring, the inner surface having a radially inward facing bearing surface extending between a first radially inwardly extending flange and a second radially inwardly extending flange;
a one piece inner member extending into the interior area, the inner member having a groove formed therein between a third axial end and a fourth axial end of the inner member, the inner member extending continually between the third axial end and the fourth axial end:
a retaining ring positioned in the groove;
a first row of a plurality of first rollers positioned in the interior area between and in rolling engagement with the inner member and the radially inward facing bearing surface, the first row of the plurality first rollers being positioned between and engaging the retaining ring and the first radially inwardly extending flange;
a second row of a plurality of second rollers positioned in the interior area between and in rolling engagement with the inner member and the radially inward facing bearing surface, the second row of the plurality second rollers being positioned between and engaging the retaining ring and the second radially inwardly extending flange;
each of the plurality of first rollers and each of the plurality of second rollers having a roller length and a roller outside diameter;
wherein a ratio of the roller length to the roller outside diameter is less than 2.8;
the outer ring having a second outside diameter;
wherein a ratio of the second outside diameter to the roller outside diameter ranges from 7.25 to 9.75;
the inner surface further comprises a first seal receiving pocket formed between the first radially inwardly extending flange and the first axial end; and a first annular seal positioned in and seated in the first seal receiving pocket, a portion of the first annular seal slidingly and sealingly engaging the inner member.

\* \* \* \* \*